United States Patent
Short

(10) Patent No.: US 8,814,169 B2
(45) Date of Patent: Aug. 26, 2014

(54) BRUSH SEAL FRONT PLATE AND ASSEMBLY

(75) Inventor: John F. Short, Smithfield, RI (US)

(73) Assignee: Eaton Corporation, Cleveland, OH (US)

( * ) Notice: Subject to any disclaimer, the term of this patent is extended or adjusted under 35 U.S.C. 154(b) by 580 days.

(21) Appl. No.: 12/347,013

(22) Filed: Dec. 31, 2008

(65) Prior Publication Data

US 2010/0164178 A1 Jul. 1, 2010

(51) Int. Cl.
*F16J 15/44* (2006.01)
*F01D 11/02* (2006.01)
*F16J 15/32* (2006.01)

(52) U.S. Cl.
CPC .................. *F16J 15/3288* (2013.01)
USPC ....................................................... 277/355

(58) Field of Classification Search
USPC ......................................................... 277/355
See application file for complete search history.

(56) References Cited

U.S. PATENT DOCUMENTS

| | | | | |
|---|---|---|---|---|
| 4,595,207 A | * | 6/1986 | Popp ............................ | 277/303 |
| 4,645,217 A | * | 2/1987 | Honeycutt et al. ............ | 277/555 |
| 5,351,971 A | * | 10/1994 | Short ............................ | 277/355 |
| 5,401,036 A | * | 3/1995 | Basu ............................. | 277/355 |
| 5,568,931 A | * | 10/1996 | Tseng et al. .................. | 277/355 |
| 5,884,918 A | * | 3/1999 | Basu et al. .................... | 277/355 |
| 6,032,959 A | * | 3/2000 | Carter ........................... | 277/355 |
| 6,079,945 A | * | 6/2000 | Wolfe et al. ................... | 415/231 |
| 6,254,344 B1 | * | 7/2001 | Wright et al. ................. | 415/231 |
| 6,308,957 B1 | * | 10/2001 | Wright ........................... | 277/355 |
| 7,364,165 B2 | * | 4/2008 | Nakano et al. ................ | 277/355 |
| 7,578,509 B2 | * | 8/2009 | Grondahl ....................... | 277/355 |
| 7,735,833 B2 | * | 6/2010 | Braun et al. ................... | 277/355 |
| 2003/0025274 A1 | * | 2/2003 | Allan et al. .................... | 277/355 |
| 2006/0033285 A1 | * | 2/2006 | Nishimoto et al. ........... | 277/355 |
| 2008/0284107 A1 | * | 11/2008 | Flaherty et al. ............... | 277/355 |

FOREIGN PATENT DOCUMENTS

DE  4029010 C1  1/1992
EP  0893632 A2  1/1999

OTHER PUBLICATIONS

European Patent Office, International Search Report and Written Opinion for counterpart PCT Application No. PCT/IB2009/007900, mailed Mar. 25, 2010.

* cited by examiner

*Primary Examiner* — Kristina Fulton
*Assistant Examiner* — Nicholas L Foster
(74) *Attorney, Agent, or Firm* — Dykema Gossett PLLC

(57) ABSTRACT

A front plate and brush seal assembly for providing a seal between a high pressure area and a low pressure area. An embodiment of a front plate includes a front plate body. The front plate body includes an inner peripheral edge and an outer peripheral edge. A plurality of cuts or slots are provided in the front plate body and extend from the outer peripheral edge of the front plate body toward the inner peripheral edge of the front plate body, such that the plurality of cuts or slots do not extend to the inner peripheral edge, and the plurality of cuts or slots define a plurality of fingers in the front plate body. In an embodiment of a brush seal assembly, the assembly includes a retaining plate that is connected to a front plate.

13 Claims, 6 Drawing Sheets

BRUSH SEAL FRONT PLATE AND ASSEMBLY

TECHNICAL FIELD

The present invention generally relates to shaft seals, such as those used in connection with gas turbine engines.

BACKGROUND

Brush seals have been employed as a means for sealing high pressure gas or fluid areas from low pressure gas or fluid areas. For example, brush seals may be used in connection with gas turbine engines. Brush seals commonly inhibit flow of gas or liquid along a shaft. Conventional brush seals typically include an annular retaining plate, an annular back plate, and a plurality of flexible bristles (or a bristle pack) that are secured between the retaining plate and back plate. When a brush seal is used to provide a seal with respect to a shaft, the tips of the bristles generally contact or run near the shaft to seal a system pressure from a discharge pressure.

Some conventional brush seals provide a recessed back plate and a flexible front plate that is concentric with the bristle pack. The front plate may be provided on the high pressure side of the bristle pack. A plurality of fingers may be provided to sandwich the bristle pack between the front plate and a rigid back plate. An example of a brush seal with a flexible front plate is disclosed in U.S. Pat. No. 5,884,918 to Basu et al.

SUMMARY

A front plate and brush seal assembly for providing a seal between a high pressure area and a low pressure area. An embodiment of a front plate includes a front plate body. The front plate body includes an inner peripheral edge and an outer peripheral edge. A plurality of cuts or slots are provided in the front plate body and extend from the outer peripheral edge of the front plate body toward the inner peripheral edge of the front plate body, such that the plurality of cuts or slots do not extend to the inner peripheral edge, and the plurality of cuts or slots define a plurality of fingers in the front plate body. In an embodiment of a brush seal assembly, the assembly includes a retaining plate that is connected to a front plate.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
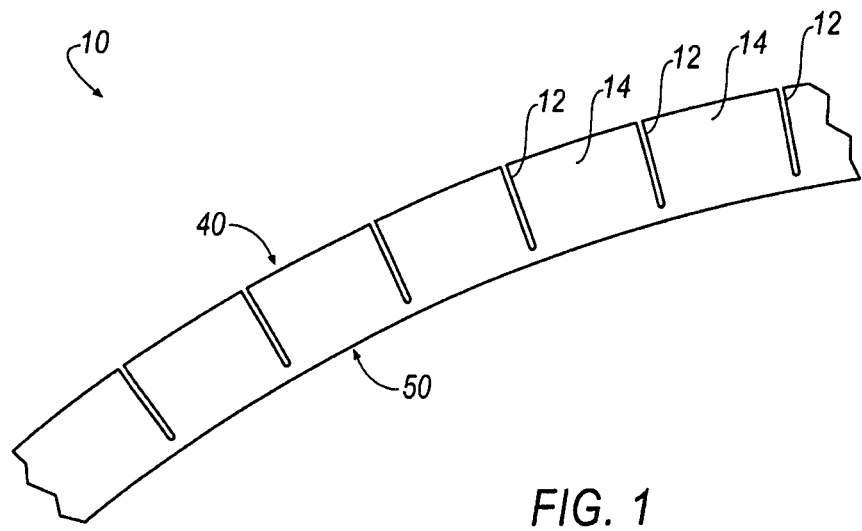
FIG. 1 is partial front view of an embodiment of a front plate in accordance with teachings of the invention.
Figure 2:
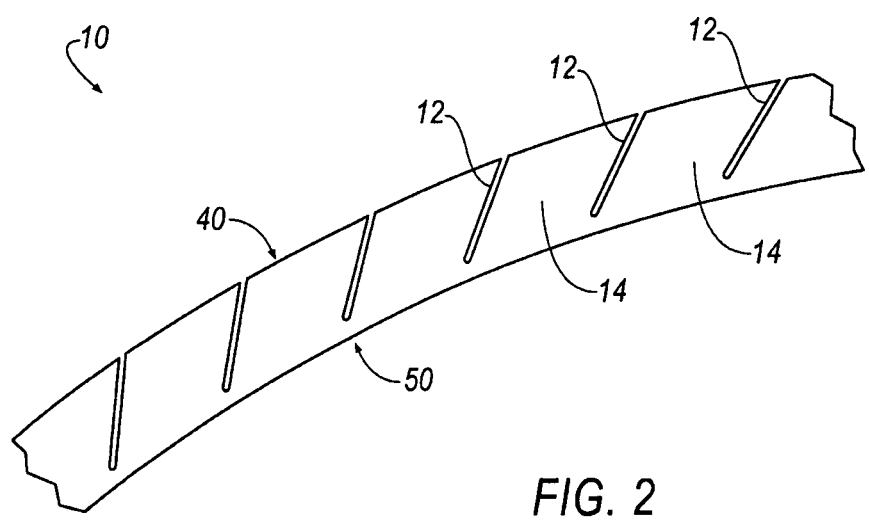
FIG. 2 is a partial front view of another embodiment of a front plate in accordance with teachings of the invention.

FIGS. 1 and 2 illustrate embodiments of front plates 10 shown in accordance with teachings of the present invention. FIG. 1 generally depicts a portion of a front plate 10 (also referred to as a "front plate body") including slots 12 (or sometimes also referred to as "cuts")—in this instance radial slots—that define a plurality of fingers 14. FIG. 2 also generally illustrates a front plate 10 that includes slots 12. However, the slots 12 included in the front plate 10 are angled and serve to define angled fingers 14 in the front plate 10.

In embodiments, for example as illustrated in FIGS. 1 and 2, slots 12 extend from an outer peripheral edge 40 of the front plate toward an inner peripheral edge 50. However, it is noted that the slots 12 shown in the illustrated embodiments do not extend up to (or through) the inner diameter, i.e., that is the slots 12 do not extend all the way up the inner peripheral edge 50. The slot-finger configurations may take on a variety of types and forms, including radial slots (see, e.g., FIG. 1) and angled slots (see, e.g., FIG. 2). Without limitation, in an embodiment the slots 12 are within the range of from about 3 mils to about 15 mils wide. However, the invention is not limited to a single configuration, and the numbers, sizes, and/or patterns of slots may vary.

In embodiments, to help maintain a desired amount of axial flexibility, the outer diameter of the flexible front plate 10 should be permitted to move or translate to some degree in the radial direction. This may be contrary to certain retention objectives associated with some prior seal configurations, which often prevent the front plate from shifting radially—for example, where tack or spot welding is employed to secure the front plate to a retaining plate. With embodiments of the invention, the front plate 10 is restrained at a portion adjacent or near the inner diameter (or inner peripheral edge). However, not all welding and similar restraining techniques are desirable as some techniques can introduce undesirable axial stiffness into the movement of the flexible front plate 10 by restricting radial movement of the front plate 10. With embodiments of the invention, features can be introduced that allow welding (e.g., spot welding) of the flexible front plate 10 to a retaining plate without unduly impacting axial stiffness.

In embodiments of the invention, the flexible front plate 10 will be retained at or about a portion near the outer diameter. For embodiments of the invention, the front plate 10 will be restrained in the circumferential direction, but some radial movement (e.g., substantially symmetrical radial movement at the front plate outer diameter) may be permitted. This manner of restraint or retention can be accomplished by employing various techniques.

Figure 3A:
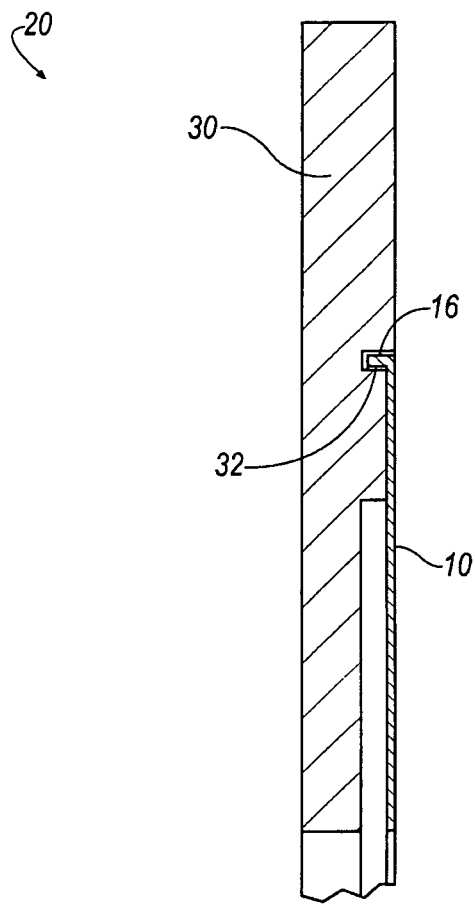
FIG. 3A is side cross sectional view of a front plate-retainer plate assembly according to an embodiment of the invention.
Figure 3B:
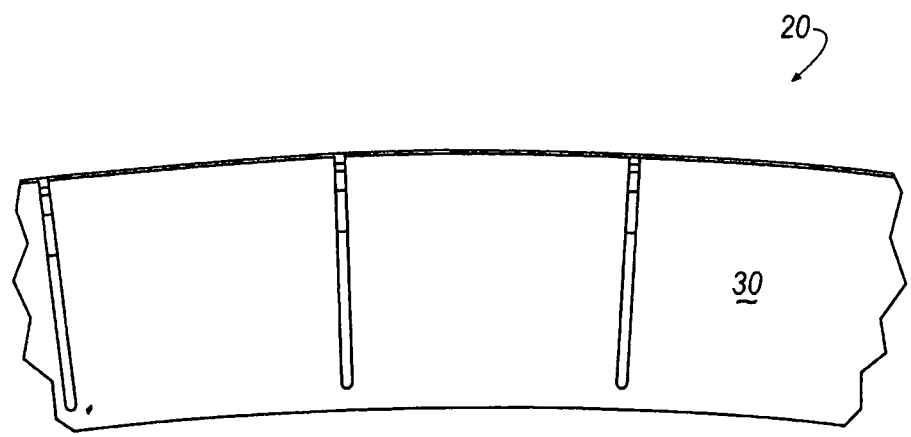
FIG. 3B is a front view of a portion of the assembly illustrated in FIG. 3A.

For instance, in an embodiment, a feature or portion 16 of the front plate 10 may be "trapped," or retained or restrained, in a corresponding or mating feature associated with a retainer, e.g., a retaining plate. FIGS. 3A and 3B generally illustrate an embodiment of an assembly 20 that includes a flexible front plate 10 and an associated retaining plate 30. In the illustrated embodiment, flexible front plate 10 includes a portion 16 (e.g., a lip) that may be trapped or restrained (e.g., in a sliding interface or arrangement) by or within a portion of a formation 32 (e.g., a groove or recess) associated with the retaining plate 30. In other embodiments, trapping or retention of a portion of the front plate 10, i.e., at or about the outer diameter portion thereof, can also be provided by placing the flexible front plate 10 in a groove machined in the retaining plate 30. With such configurations, the flexible front plate 10 can be captured or retained between a bristle pack and a retaining plate.

In another embodiment, a welding-type technique, e.g., spot welding—can be employed at specific or select locations toward the end of the flexible front plate 10 closer in proximity to the outer diameter of the front plate 10. For such embodiments, it is generally desirable to weld portions of the front plate 10 at only a few locations (e.g., locations 40 generally illustrated in FIGS. 4 and 5) so as not to substantially or unduly increase the axial stiffness of the front plate 10.

Figures 4, 5:
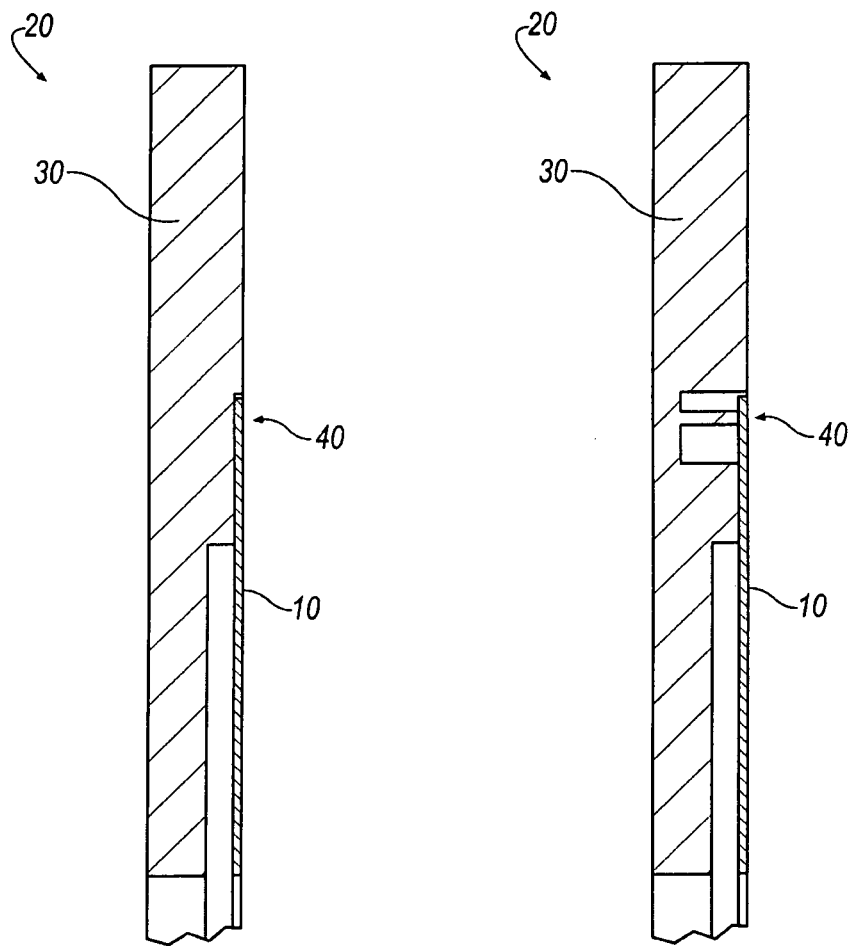
FIGS. 4, 5, and 6 are side cross sectional views of embodiments of front plate-retainer plate assemblies according to other embodiments of the invention.
Figure 6:
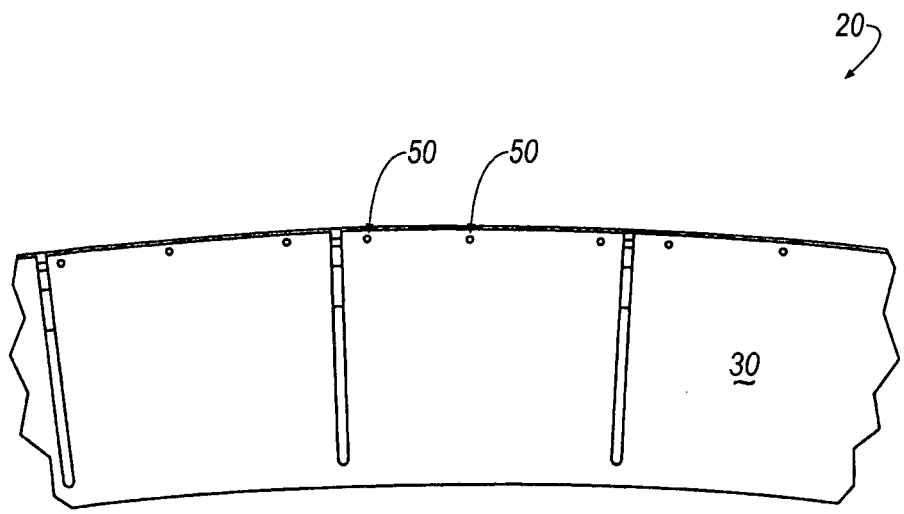

FIGS. 5 and 6 generally illustrate another embodiment of the assembly 20. In this embodiment, a plurality of grooves—which may comprise a double-groove—may be provided (e.g., machined) in a retaining plate 30. Flexible front plate 10 may be welded (e.g., spot welded) at specific locations (such as generally illustrated as locations 50 in FIG. 6) that correspond to portions of a land region 60 (see, e.g., FIG. 7) that are provided between the grooves in the retaining plate 30.

Figure 7:
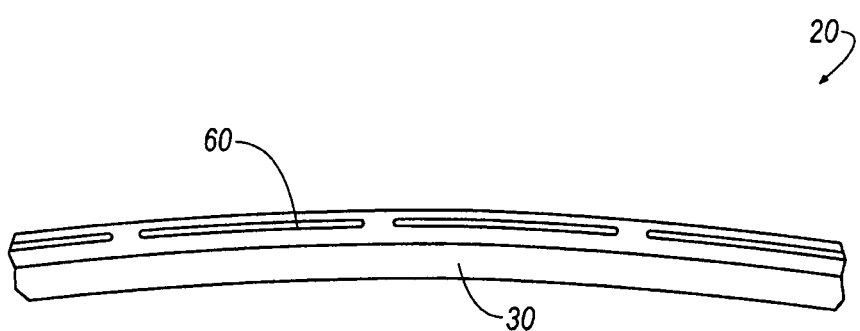
FIG. 7 generally illustrates a partial front view of a double-groove embodiment of the invention with a plurality of slots provided in the associated land region.

In embodiments of the assembly that employ a double-groove, a portion of a land region (or "beam") can effectively be provided that can, itself, deflect in the radial direction. If desired, to further weaken the beam kerfs or slots can be provided in the land region. For example and without limitation, as generally illustrated in FIG. 7, a plurality of slots can be cut at select angles in the land regions.

Figure 8:
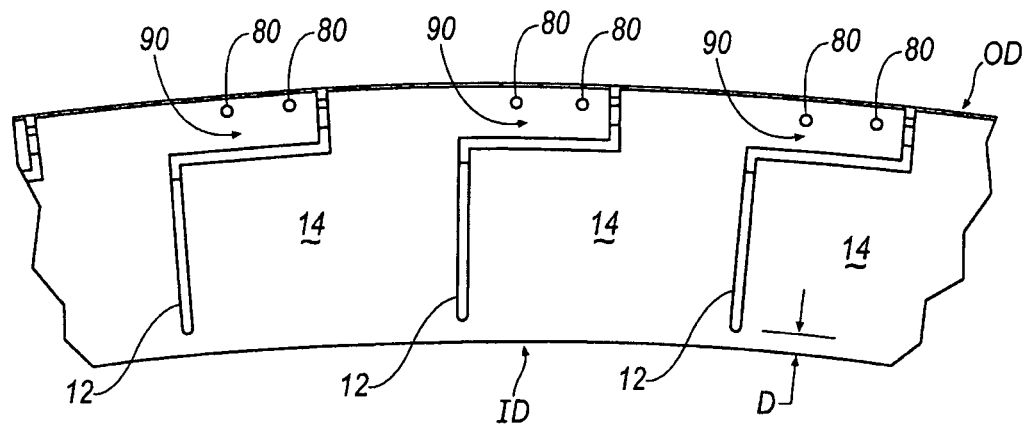
FIGS. 8, 9, and 10 are partial front views of embodiments of front plate-retainer plate assemblies according to yet other embodiments of the invention.

FIG. 8 generally illustrates an embodiment of the invention in which cuts or kerfs 12 are provided in a flexible front plate 10. In the illustrated embodiment, the cuts or kerfs 12 are not straight, but are turned or angled before breaking continuing on to the outer diameter OD of the front plate 10. This type of configuration can provide a cantilever-type beam in connection with a front plate 10. In an embodiment one or more weld locations (e.g., spot weld locations) 80, or other forms of connecting techniques, may be utilized to connect front plate 10 to retaining plate 30. The one or more weld locations 80 may be provided in a cantilever beam section (generally designated as section 90 in FIG. 8) of front plate 10. Such a configuration can permit some flexibility of the front plate 10 in the radial direction when axial deflection of the front plate 10 occurs.

Figure 9:
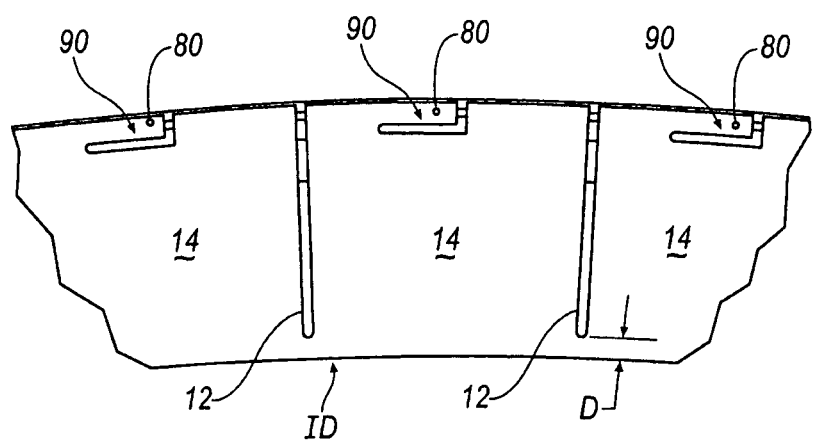

A further non-limiting example of a connection configuration between a flexible front plate 10 and a retaining plate 30 is shown in FIG. 9. As generally illustrated, a separate or independent cantilever beam section 90 may be provided (e.g., cut) in the flexible front plate 10. In such an embodiment, the cantilever beam section 90 is not part of the cuts or slots 12 between the defined fingers 14. In an embodiment, and as generally shown in FIG. 9, one or more weld locations 80 may be provided to weld (or connect) the flexible front plate 10 to the retainer plate 30. This can offer a measure of radial motion flexibility with respect to the front plate 10.

With further reference to FIGS. 8 and 9, a distance D is generally illustrated. The distance D generally represents a distance from the innermost radial portion of a cut or slot 12 and the inner diameter ID of the flexible front plate 10. By way of example, and without limitation as to the embodiments illustrated in FIGS. 8 and 9, distance D may range from about 0.025 inches to about 0.075 inches.

Figure 10:
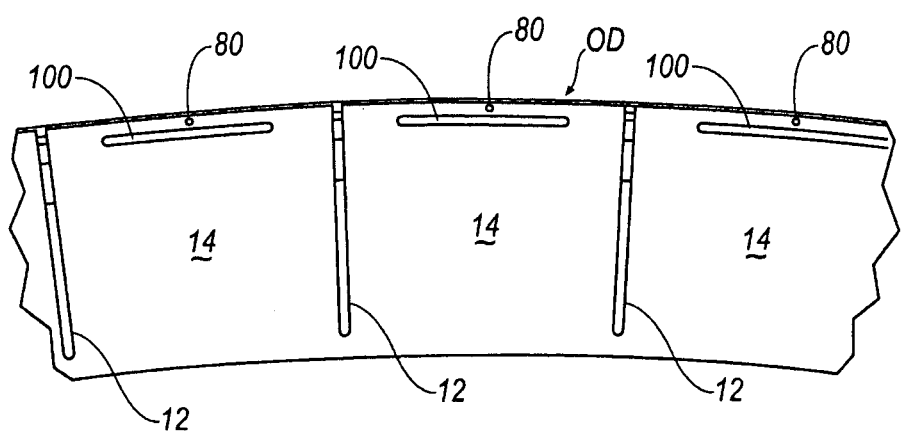

FIG. 10 illustrates yet another embodiment of a connection configuration between a flexible front plate 10 and a retaining plate 30. In the illustrated embodiment, a separate end-supported beam 100 is provided in a defined finger 14 of the flexible front plate 10 near the outer diameter OD of the finger 14. For example, without limitation, the end-supported beam 100 may be provided within about 0.025 inches to about 0.100 inches from the outer diameter OD. In the illustrated embodiment, a single weld location 80 is provided at or about a midpoint of the beam section 90 (which is provided between the end-supported beam 100 and the outer diameter OD of the finger 14).

It is noted that while some exemplary connection or weld locations (such as those identified as elements 80) are illustrated in connection with several depicted embodiments, the weld locations can be provided in connection with every finger location, or instead only at a few locations. Also while multiple weld locations 80 may be shown, if desired, welding may instead be provided in as little as one location to hold the front plate 10 and the retaining plate 30 in position. Moreover, various combinations of connection configurations and methods may be employed. For instance, a front plate could be captured within a groove in the retaining plate, and a single spot weld could be used to weld portions of the two components together.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A brush seal assembly comprising:
a front plate that is flexible, comprises a single, unitary structure, and includes an inner peripheral edge, an outer peripheral edge, and a plurality of cuts or slots extending from the outer peripheral edge toward the inner peripheral edge; the plurality of cuts or slots extend to almost the inner peripheral edge, the cuts or slots do not extend to the inner peripheral edge, and the plurality of cuts or slots define a plurality of fingers in the front plate;
a retaining plate; and
a bristle pack;
wherein the front plate is attached to the retaining plate at one or more locations on the plurality of fingers so that the front plate is at least partially restrained by the retaining plate at a portion of the front plate adjacent or near the outer peripheral edge; the inner peripheral edge and a segment of the front plate adjacent the inner peripheral edge extend freely and are spaced from the retaining plate; the front plate is disposed between the bristle pack and the retaining plate; and the assembly is configured so that the outer peripheral edge of the front plate is free to move to a degree in the radial direction.

2. The brush seal assembly of claim 1, wherein the front plate and the retaining plate are generally annular.

3. The brush seal assembly of claim 1, wherein the retaining plate is attached to the front plate at the outer peripheral edge via an engagement between a flange portion of the front plate and a corresponding groove in the retaining plate.

4. The brush seal assembly of claim 3, wherein front plate is welded to the retaining plate at the one or more locations.

5. The brush seal assembly of claim 1, wherein at least two grooves are provided in a retaining plate and the at least two grooves form a land that corresponds to a portion of the front plate at or about the outer diameter of the front plate.

6. The brush seal assembly of claim 5, wherein the front plate is welded to the retaining plate at one or more locations in the land formed between at the at least two grooves.

7. The brush seal assembly of claim 1, wherein the front plate includes one or more cuts or kerfs that include an turned or angled segment before continuing on to the outer diameter of the front plate.

8. The brush seal assembly of claim 1, wherein the flexible front plate includes a cantilever beam section separate or independent from the cuts or slots between defined fingers.

9. The brush seal assembly of claim 1, wherein, a separate end-supported beam is provided in a defined finger 14 of the flexible front plate near the outer diameter of the finger.

10. The brush seal assembly of claim 9, wherein a weld location for connecting the front plate to the retaining plate is provided at or about a midpoint of the beam between the end-supported beam and the outer diameter of the finger.

11. The brush seal assembly of claim 1, wherein a portion of the front plate engages or is retained by a means for retaining provided in the retaining plate, and at least one weld is provided to weld a portion of the front plate and a portion of the retaining plate.

12. A brush seal assembly comprising:
a front plate including a single, unitary structure having a substantially constant circumferential thickness, and including an inner peripheral edge, an outer peripheral edge, and a plurality of cuts or slots extending from the outer peripheral edge toward the inner peripheral edge; the plurality of cuts or slots extend to almost the inner peripheral edge, the cuts or slots do not extend to the inner peripheral edge, and the plurality of cuts or slots define a plurality of fingers in the front plate;
a retaining plate having at least one recess corresponding to a flange portion on one or more of the plurality of fingers; and
a bristle pack;
wherein the front plate is connected to the retaining plate and the front plate is at least partially restrained at a portion of the front plate adjacent or near the outer peripheral edge; the plurality of cuts or slots are configured such that adjacent cuts or slots do not overlap in a radial direction; the inner peripheral edge and a segment of the front plate adjacent the inner peripheral edge extend freely and are spaced from the retaining plate; the front plate is disposed between the bristle pack and the retaining plate; and the assembly is configured so that the outer peripheral edge of the front plate is free to move to a degree in the radial direction.

13. The front plate of claim 12, wherein the distance from the innermost radial portion of a cut or slot and the inner peripheral edge of the front plate body is within the range of from about 0.025 inches to about 0.075 inches.

* * * * *